United States Patent
Kawai

(10) Patent No.: US 10,432,877 B2
(45) Date of Patent: Oct. 1, 2019

(54) IMAGE PROCESSING SYSTEM, IMAGE PROCESSING METHOD AND PROGRAM STORAGE MEDIUM FOR PROTECTING PRIVACY

(71) Applicant: NEC Corporation, Minato-ku, Tokyo (JP)

(72) Inventor: Ryo Kawai, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/322,220

(22) PCT Filed: Jun. 17, 2015

(86) PCT No.: PCT/JP2015/003031
§ 371 (c)(1),
(2) Date: Dec. 27, 2016

(87) PCT Pub. No.: WO2016/002152
PCT Pub. Date: Jan. 7, 2016

(65) Prior Publication Data
US 2017/0142343 A1      May 18, 2017

(30) Foreign Application Priority Data

Jun. 30, 2014   (JP) .................. 2014-134961

(51) Int. Cl.
*H04N 5/262*   (2006.01)
*H04N 5/265*   (2006.01)
(Continued)

(52) U.S. Cl.
CPC ......... *H04N 5/265* (2013.01); *G06K 9/00744* (2013.01); *G06K 9/38* (2013.01);
(Continued)

(58) Field of Classification Search
CPC ..................................................... H04N 5/265
(Continued)

(56) References Cited

U.S. PATENT DOCUMENTS

2004/0081338 A1   4/2004   Takenaka
2005/0180595 A1   8/2005   Horii et al.

FOREIGN PATENT DOCUMENTS

JP   2000-000216 A    1/2000
JP   2002-358527 A   12/2002
(Continued)

OTHER PUBLICATIONS

Noboru Babaguchi, "Privacy Protected Video Surveillance", IPSJ Magazine, vol. 48, No. 1, pp. 30-36, Jan. 2007. (Cited in the Specification).

(Continued)

*Primary Examiner* — Usman A Khan

(57) ABSTRACT

An image processing system includes: a receiving unit configured to receive an input of a plurality of image frames constituting a video from an imaging apparatus; a detection unit configured to detect a feature point included in an image frame to be processed in the plurality of image frames; and an output unit configured to output an output image obtained by superimposing an image frame to be processed of an area detected as a feature point on a background image generated from at least some of a plurality of image frames.

8 Claims, 6 Drawing Sheets

(51) Int. Cl.
*G06T 7/20* (2017.01)
*G06T 7/13* (2017.01)
*G06K 9/46* (2006.01)
*H04N 5/907* (2006.01)
*G06K 9/00* (2006.01)
*G06K 9/38* (2006.01)
*H04N 5/272* (2006.01)
*G06T 7/11* (2017.01)
*G06T 7/194* (2017.01)

(52) U.S. Cl.
CPC .............. *G06K 9/4604* (2013.01); *G06T 7/11* (2017.01); *G06T 7/13* (2017.01); *G06T 7/194* (2017.01); *G06T 7/20* (2013.01); *H04N 5/272* (2013.01); *H04N 5/907* (2013.01); *G06T 2207/10016* (2013.01); *G06T 2207/20221* (2013.01); *G06T 2207/20224* (2013.01); *G06T 2207/30196* (2013.01)

(58) Field of Classification Search
USPC ........................................................ 348/239
See application file for complete search history.

(56) References Cited

FOREIGN PATENT DOCUMENTS

| | | | |
|---|---|---|---|
| JP | 2005-236464 | A | 9/2005 |
| JP | 2007-213181 | A | 8/2007 |
| JP | 4036051 | B2 | 1/2008 |
| JP | 2009-225398 | A | 10/2009 |
| JP | 4701356 | B2 | 6/2011 |
| JP | 2013-066016 | A | 4/2013 |
| JP | 2013066016 | A * | 4/2013 |
| JP | 2013-143069 | A | 7/2013 |
| JP | 2013-186838 | A | 9/2013 |

OTHER PUBLICATIONS

International Search Report for PCT Application No. PCT/JP2015/003031, dated Sep. 15, 2015.
English translation of Written opinion for PCT Application No. PCT/JP2015/003031.

* cited by examiner

1

IMAGE PROCESSING SYSTEM, IMAGE PROCESSING METHOD AND PROGRAM STORAGE MEDIUM FOR PROTECTING PRIVACY

This application is a National Stage Entry of PCT/JP2015/003031 filed on Jun. 17, 2015, which claims priority from Japanese Patent Application 2014-134961 filed on Jun. 30, 2014, the contents of all of which are incorporated herein by reference, in their entirety.

TECHNICAL FIELD

Some aspects of the present invention relate to an image processing system, an image processing method, and a program storage medium.

BACKGROUND ART

Videos captured by an imaging apparatus such as a monitoring camera not only are significantly useful for prevention of crime or a criminal investigation but also can be used for a variety of applications such as exploitation in a field of marketing using an analysis of customer's traffic line or the like. However, when using a video, it is desirable to perform protection of private information or a portrait right by abstracting a person appeared in the video.

On the other hand, in order to analyze a behavior of a person appeared on a video for marketing or the like, it is desirable also to understand what action a person does or how a person interacts with a background object.

In order to meet both of these needs, it is demanded that a concrete action of a person is known and simultaneously what is on the background is seen while who a person appeared on a video is cannot be identified.

In order to meet at least some of such a demand, Patent Literature 1 discloses a technique in which a face is detected and a portion thereof is pixelated. Patent Literature 2 discloses a technique in which a portion different from a background is pixelated or painted in black. Patent Literature 3 discloses a technique of a blurring process as a means for protecting private information. Patent Literature 4 discloses a technique in which a foreground image in an image is synthesized into a background image or a mask processing or the like is performed on the foreground image depending on the authority of a user for the foreground image. Patent Literature 5 discloses a technique in which a person area is specified from an image and the person area is changed to another image.

Further, Non Patent Literature 1 discloses a technique such as see-through expression or expression of a contour in a specific color.

CITATION LIST

Patent Literature

PTL 1: Japanese Patent No. 4036051
PTL 2: Japanese Unexamined Patent Application Publication No. 2000-000216
PTL 3: Japanese Patent No. 4701356
PTL 4: Japanese Unexamined Patent Application Publication No. 2009-225398
PTL 5: Japanese Unexamined Patent Application Publication No. 2013-186838

Non Patent Literature

NPL 1: Noboru BABAGUCHI, "Privacy Protected Video Surveillance", IPSJ Magazine, Vol. 48, No. 1, pp. 30-36, January, 2007

SUMMARY OF INVENTION

Technical Problem

However, as in a method described in PTL 1, private information cannot be completely protected since information about clothes, belongings or the like other than a face will be left only by pixelating a face portion. Although PTL 2 and PTL 3 disclose a technique of performing mosaicking, blurring, painting-out, or the like on the whole person, most of information about person's behavior such as picking up an object will be lost since information in a person area or around a person is largely reduced. As in a method of NPL 1, an individual is easily specified by a see-through expression. In a method of contour expression, a person needs to be highly precisely extracted, and it is technically difficult to precisely extract a contour of the person.

Some aspects of the present invention have been made in view of the above-described problems, and an object of the present invention is to provide an image processing system, an image processing method, and a program storage medium whereby an image for which private information has been suitably protected can be generated.

Solution to Problem

An image processing system according to one aspect of the present invention includes: means for receiving an input of a plurality of image frames constituting a video from an imaging apparatus; detection means for detecting a feature point included in an image frame to be processed in the plurality of image frames; and means for outputting an output image obtained by superimposing an image frame to be processed of an area detected as a feature point on a background image generated from at least some of a plurality of image frames.

An image processing method according to one aspect of the present invention includes: receiving an input of a plurality of image frames constituting a video from an imaging apparatus; detecting a feature point included in an image frame to be processed in the plurality of image frames; and outputting an output image obtained by superimposing an image frame to be processed of an area detected as a feature point on a background image generated from at least some of a plurality of image frames.

A storage medium according to one aspect of the present invention for storing a program causing a computer to execute: a processing of receiving an input of a plurality of image frames constituting a video from an imaging apparatus; a processing of detecting a feature point included in an image frame to be processed in the plurality of image frames; and a processing of outputting an output image obtained by superimposing an image frame to be processed of an area detected as a feature point on a background image generated from at least some of a plurality of image frames.

In the present invention, a "unit", "means", "apparatus", or a "system" does not simply means a physical means, and also includes a software realizing a function of the "unit", "means", "apparatus", or "system". A function of one "unit", "means", "apparatus", or "system" may be realized by two or more physical means or apparatuses, or two or more functions of a "unit", "means", "apparatus", or a "system" may be realized by one physical means or apparatus.

Advantageous Effects of Invention

According to the present invention, an image processing system, an image processing method, and a program storage medium whereby an image for which private information has been suitably protected can be generated can be provided.

EXAMPLE EMBODIMENT

In the following, example embodiments according to the present invention will be described. In the description of the following explanation and drawings to be referred to, identical or similar configurations have identical or similar signs, respectively.
(1 First Example Embodiment)
(1.1 Summary)
FIGS. 1 to 5 are diagrams illustrating a first example embodiment. Hereinafter, description will be made with reference to these drawings.

The present example embodiment relates to an image processing system which generates an image representing a moving object such as a person from a video captured by an imaging apparatus such as a monitoring camera. In particular, in an image processing system according to the present example embodiment, while considering private information, analysis of a behavior of a moving object such as a case of picking up goods for sale or which direction the moving object faces is considered to be performed.

In order to attain the above, an image processing system according to the present example embodiment extracts only an edge area from an image frame to be processed (hereinafter, also referred to as an original image). The image processing system then superimposes the original image of the edge area on a background image stored in a storage unit, and outputs the superimposed image. By this, a face, clothing, or the like of a moving object such as a person is not appeared or displayed on an output image to a degree to which it is recognized, and therefore, private information can be protected. On the other hand, since a contour line or the like of a moving object such as a person is included in the output image as an edge, a person's behavior such as a direction of a person or a relation with a background such as a good for sale can be analyzed. Further, even when an edge other than a moving object is detected, an edge of a portion other than the moving object is a portion corresponding to a background area in the original image, and is not considerably different from a background image on which the edge is superimposed, and therefore, a user who confirms the image does not particularly have a feeling of strangeness.

An image processing system according to the present example embodiment is a system in which an edge area in an image frame to be processed (original image) is detected, but is not limited thereto. For example, an image processing system may be a system in which a special point such as a corner point is extracted.

Figure 1:
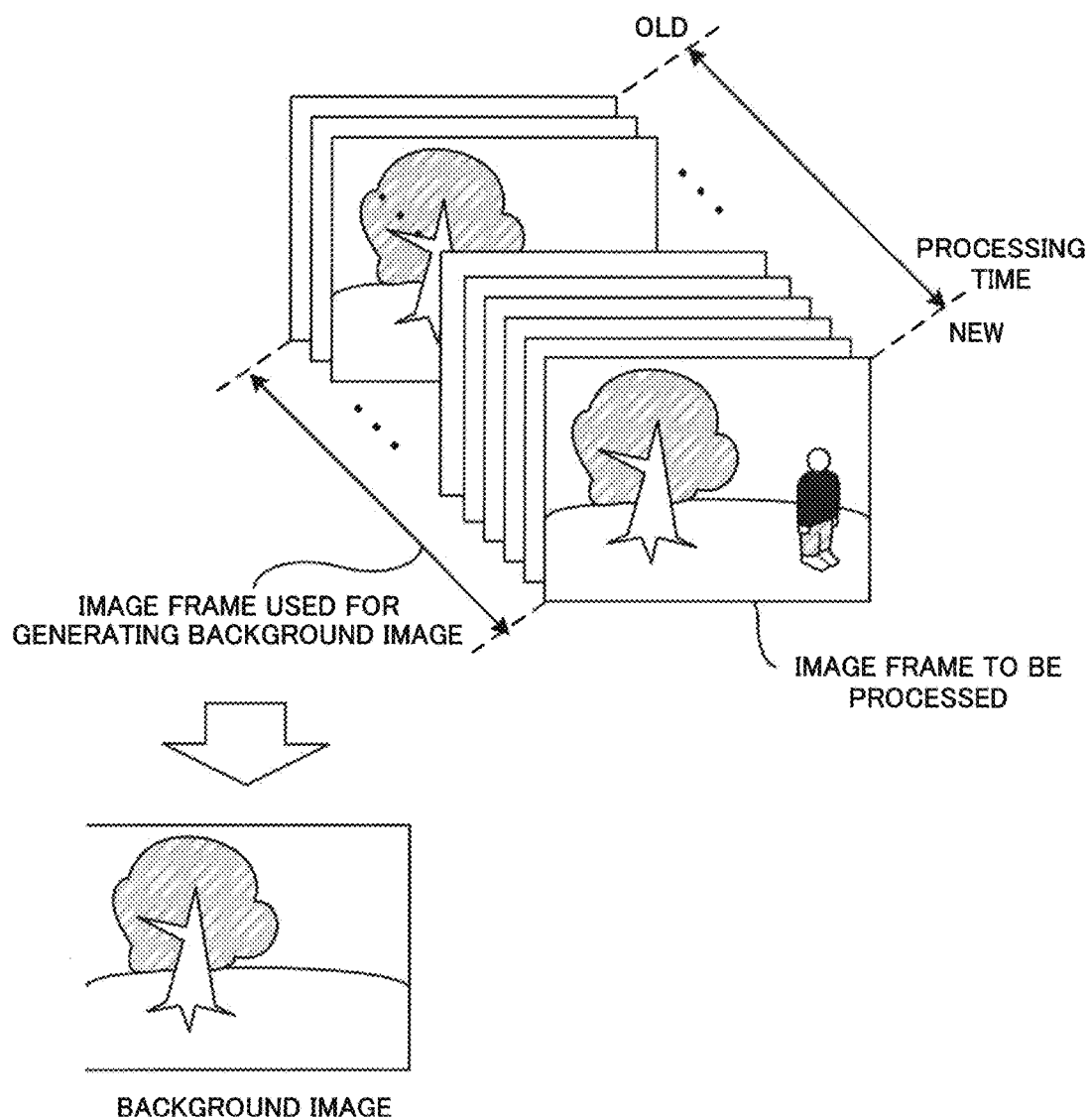
FIG. 1 is a diagram illustrating an example of a relationship between an input image frame and a background image.

FIG. 1 illustrates an example of an image frame which is input to an image processing system according to the present example embodiment. In the example of FIG. 1, image frames each at different imaging times constituting a video are input sequentially. A background image can be generated by a method, for example, averaging pixel values of each pixel in a plurality of image frames at different imaging times, or extracting the most frequent value from the image frames for each pixel. Alternatively, one fixed image frame on which a moving object is not captured may be used as a background image.

Figure 2:
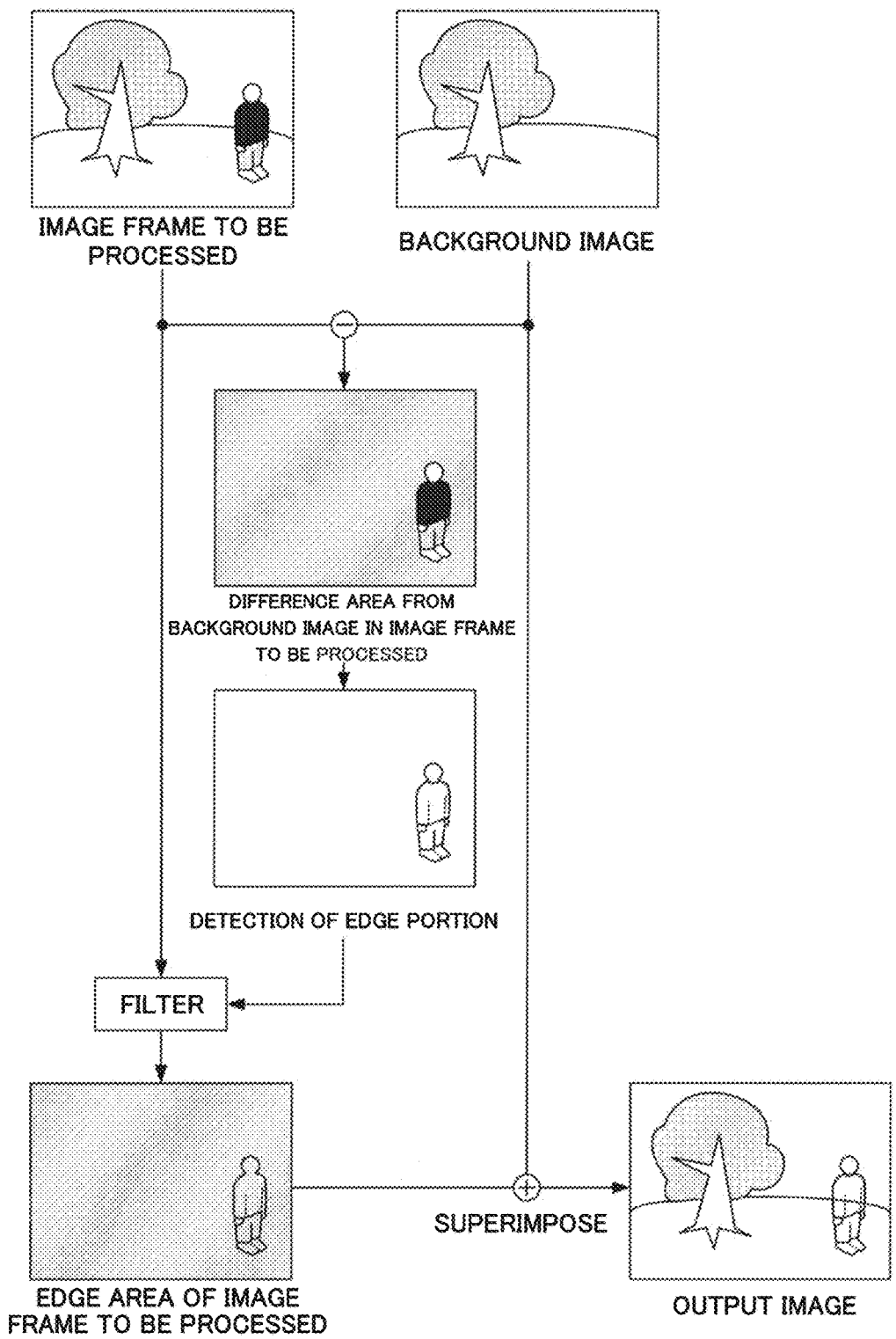
FIG. 2 is a diagram illustrating a summary of processing of an image processing system according to the present example embodiment.

Hereinafter, with reference to FIG. 2, summary of a process until an output image is generated in the present example embodiment will be described. In example of FIG. 2, an image frame to be processed (original image) on which a moving object appears and a background image are prepared in advance.

First, the image processing system specifies a difference area in an image frame to be processed from a background image. More specifically, for example, a pixel value of an image frame to be processed is compared with a pixel value of a background image for each pixel, and then, the image processing system specifies an area in which a difference between them is not less than a threshold. The area corresponds to an area on which a moving object appears in an image frame.

Next, the image processing system performs edge detection of a difference area in an image frame to be processed from a background image corresponding to an area on which the moving object appears. After that, the image processing system extracts only an edge area portion detected from the image frame to be processed. The image processing system then generates an output image by superimposing an image frame to be processed (original image) of the extracted portion on the background image.

By the output image, it is possible to visually recognize how the relationship between a background portion other than the moving object and the moving object is or what action the moving object performs. In particular, since a contour portion of the moving object can be confirmed, the direction of a face, a posture, or the like of the moving object can easily be visualized or estimated. Since a background image appears on a portion excluding a contour portion of a moving object, a face, clothing, or the like cannot be specified from an output image, and as a result, private information can be protected.

Figure 3:
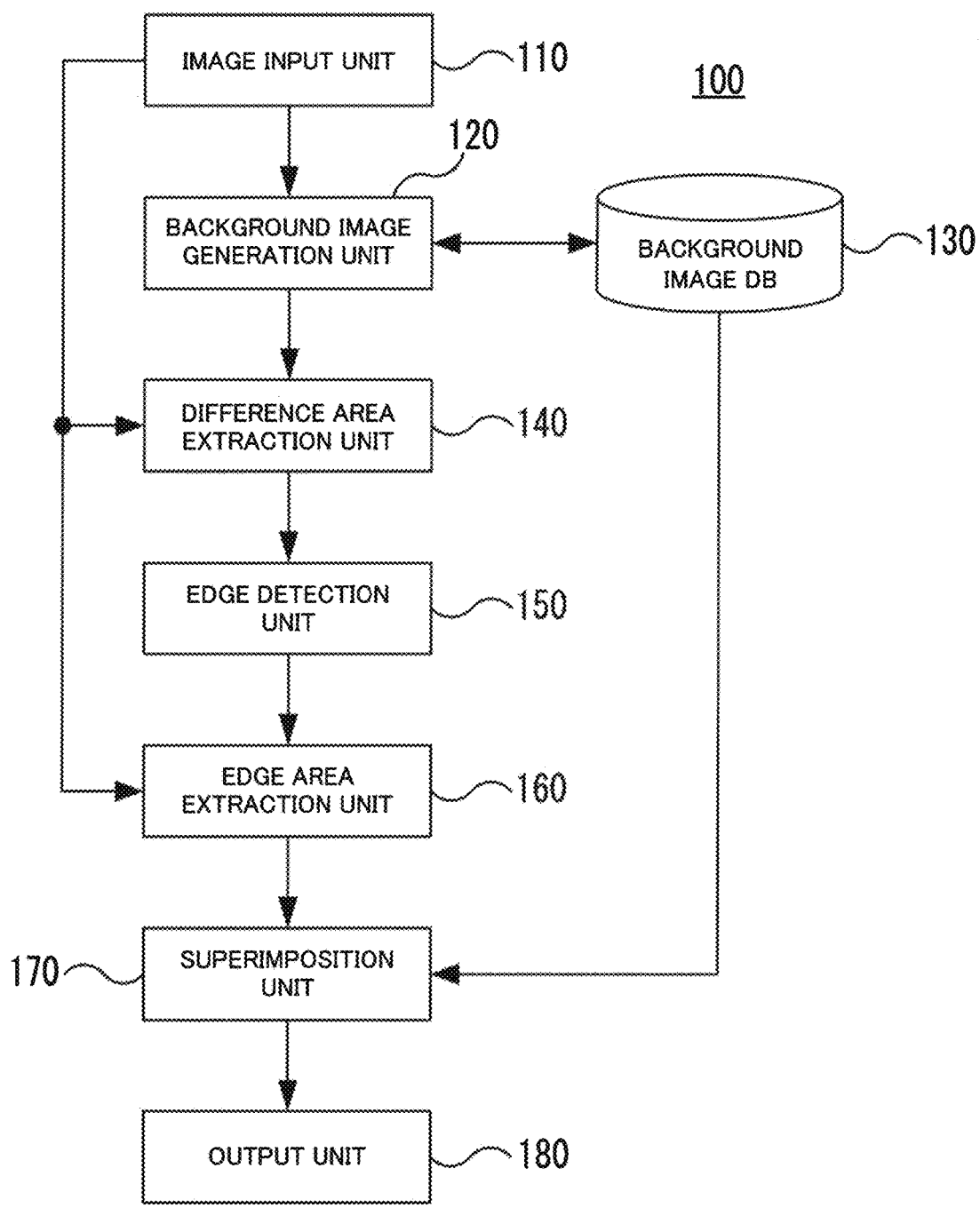
FIG. 3 is a functional block diagram illustrating schematic configuration of an image processing system according to a first example embodiment.

An image processing system of the present example embodiment having such a function can be applied to a safely field such as monitoring by utilizing a video of a monitoring camera or a marketing field in which a behavior of a moving object or the like is analyzed.
(1.2 System Configuration)
Hereinafter, with reference to FIG. 3, a system configuration of an image processing system 100 according to the present example embodiment will be described. FIG. 3 illustrates a system configuration of the image processing system 100 for generating an image for which protection of private information has been considered. The image processing system 100 includes an image input unit 110, a background image generation unit 120, a background image database (DB) 130, a difference area extraction unit 140, an edge detection unit 150, an edge area extraction unit 160, a superimposition unit 170, and an output unit 180.

The image input unit 110 receives an input of image frames constituting a video, i.e. image frames each having different imaging times from an unillustrated imaging apparatus such as a camera.

The background image generation unit 120 generates a background image from one or more image frames sequentially supplied from the image input unit 110. As described above, for example, a pixel value of each pixel of image frames input in a past certain time from a processing time may be averaged or a mode thereof may be determined to generate a background image. Alternatively, for example, one image frame in which a moving object is considered to be absent may be used as a background image. When a fixed image frame is used as a background image, the image processing system 100 does not necessarily include the background image generation unit 120. A background image to be generated is stored in the background image DB 130.

The difference area extraction unit 140 extracts, from an image frame to be processed supplied from the image input unit 110, a difference area in which a difference from a background image generated in the background image generation unit 120 is not less than a certain threshold. As described above, the difference area generally corresponds to an area of an image frame to be processed in which a moving object appears.

The edge detection unit 150 performs edge detection on a difference area in an image frame to be processed extracted by the difference area extraction unit 140. For a method of edge detection used by the edge detection unit 150, a variety of already-existing methods can be applied.

The edge area extraction unit 160 extracts only an area detected by the edge detection unit 150 as an edge from an image frame to be processed. In this case, for example, only some of a detected edge area may be extracted. For example, a head, a hand, or the like of a moving object is detected, and then, only such a site may be extracted or the transparency for extraction may be changed depending on the site. Alternatively, in order to express an edge or the whole edge corresponding to a predetermined site of a body, a detected predetermined edge area may be separated in a certain length unit, and the separated areas may be output in this length unit. As described above, the edge area extraction unit 160 may extract an area detected as an edge portion from an image frame to be processed in an aspect which differs depending on a site of a corresponding moving object and output the area, or may output the detected whole edge in a method such as expression in a dashed line. Namely, an output method of the edge area extraction unit 160 is not limited to a particular one.

Alternatively, the transparency may be changed depending on the intensity (degree of importance) of an edge detected by the edge detection unit 150. By this, since, in an output image to be generated in the superimposition unit 170 later, a strong edge portion where the degree of importance is considered to be high of a moving object (foreground) is densely displayed, and a weak edge portion where the degree of importance is considered to be low of a moving object (foreground) is lightly displayed, a visibility can be improved.

The superimposition unit 170 generates an output image obtained by superimposing an image frame to be processed of an edge area output from the edge area extraction unit 160 on a background image. For example, letting an original image (image frame to be processed) be fg, a background image be bg, and coordinates of each image be (x, y), an output image out can be expressed as follows:

$$\text{out}(x,y) = \alpha fg(x,y) + (1-\alpha) bg(x,y) \qquad \text{[Math. 1]}$$

Here, when (x, y) belongs to an edge area, $\alpha=1$, and when (x, y) does not belong to an edge area, $\alpha=0$. When a transparency is set to an area of an original image to be superimposed depending on a site or the like of an edge as described above, $\alpha$ may be set as a real number in the range of $0 \le \alpha \le 1$ depending on the transparency.

The output unit 180 outputs a generated output image. A variety of output methods may be employed, and examples thereof include displaying a video to a user by sequentially displaying output images on an apparatus, or recording such output images together as a video file on a storage medium.

In the present example embodiment, the difference area extraction unit 140 extracts a difference area in an image frame from a background image corresponding to a moving object, and then performs edge detection only on the difference area. By performing edge detection only on an area on which a moving object is assumed to appear, it is possible to prevent an image frame of a background area which is not to be analyzed from being included in an output image.

However, the present invention is not limited to the above, and edge detection may be performed without extracting a difference area. In such cases, the edge detection unit 150 performs edge detection on the whole image frame, but a pixel value of an area other than a moving object in an image frame is considered to be not significantly different from a pixel value of a background image, and therefore, a feeling of strangeness is less likely to be inspired by a user who confirms an output image. In this case, the image processing system 100 does not necessarily include the difference area extraction unit 140.

(1.3 Process Flow)

Figure 4:
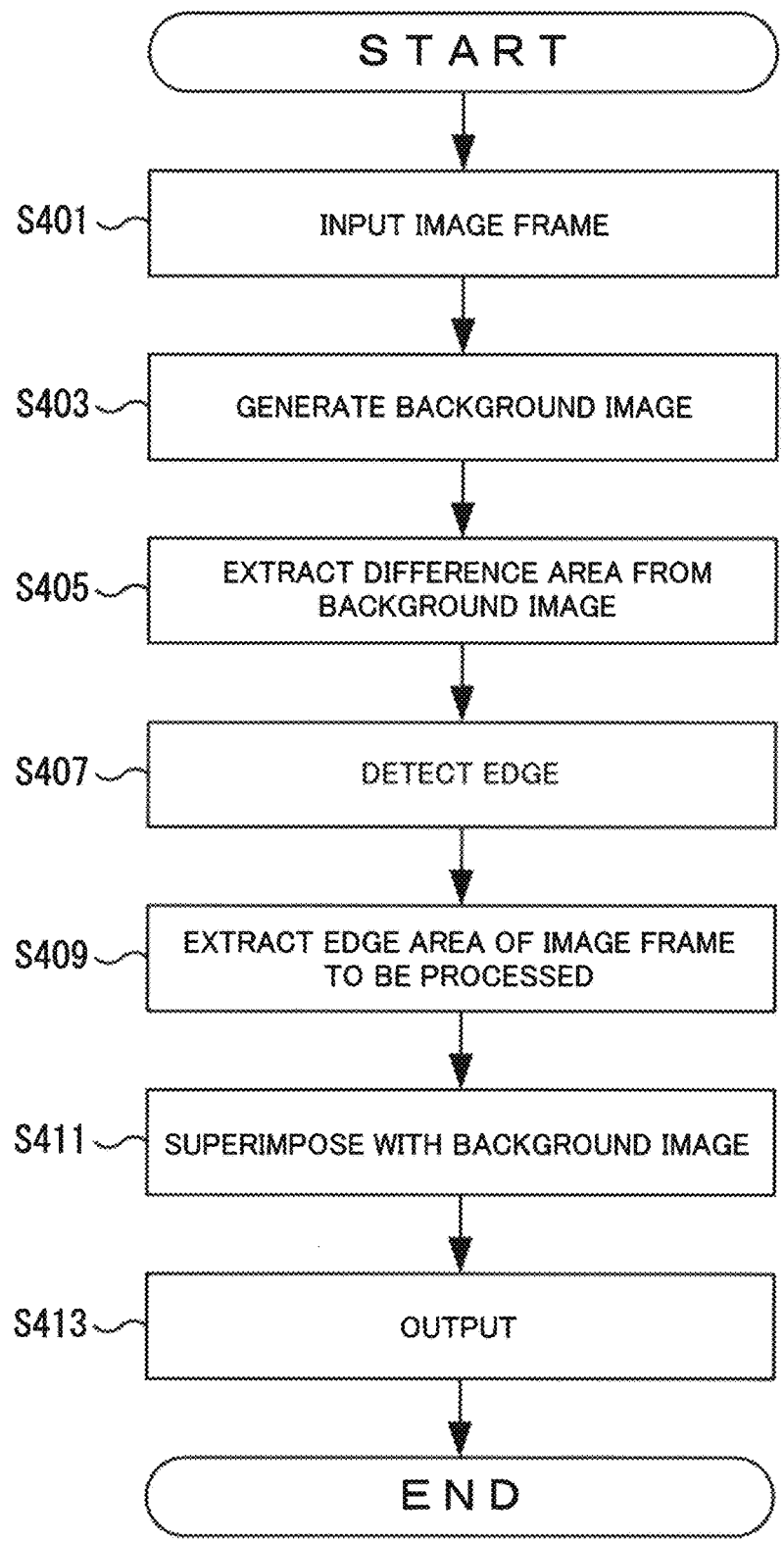
FIG. 4 is a flow chart illustrating a flow of processing of an image processing system illustrated in FIG. 3.

Hereinafter, a process flow of the image processing system 100 will be described with reference to FIG. 4. FIG. 4 is a flow chart illustrating a process flow of the image processing system 100.

Each processing step in the following may be executed in an arbitrary sequence or in parallel within the scope of not creating any inconsistencies in the processing contents, and another step may be added between the processing steps. Further, a step described as one step for the sake of convenience may be executed in a plurality of substeps, and steps described as substeps for the sake of convenience may be executed as one step.

The image input unit 110 receives an input of a new image frame (image frame at the processing time) (S401). The background image generation unit 120 generates a background image from the input image frame and a background image stored in the background image DB 130 which has been generated from an image frame input before the processing time (S403).

The difference area extraction unit 140 extracts a difference area of an input image frame from a background image (S405). The difference area is, for example, specified as an area of a pixel in which a pixel value of each pixel of an input image frame is compared with a pixel value of each pixel of a background image, and a difference between them is not less than a threshold. As described above, the difference area corresponds to a moving object area on which a moving object appears.

The edge detection unit 150 performs edge detection on a moving object area (difference area) extracted by the difference area extraction unit 140 (S407). The edge area extraction unit 160 extracts only an area detected as the edge from an image frame to be processed (S409). The superimposition unit 170 generates an output image by superimposing an image frame to be processed detected as the edge area on a background image stored in the background image DB130 (S411).

The output unit 180 outputs a generated output image to a display apparatus, a storage medium, or the like (S413). Sequentially performing processes S401 to S413 by the image processing system 100 makes it possible to display or store an output image as a video.

(1.4 Specific Example of Hardware Configuration)

Figure 5:
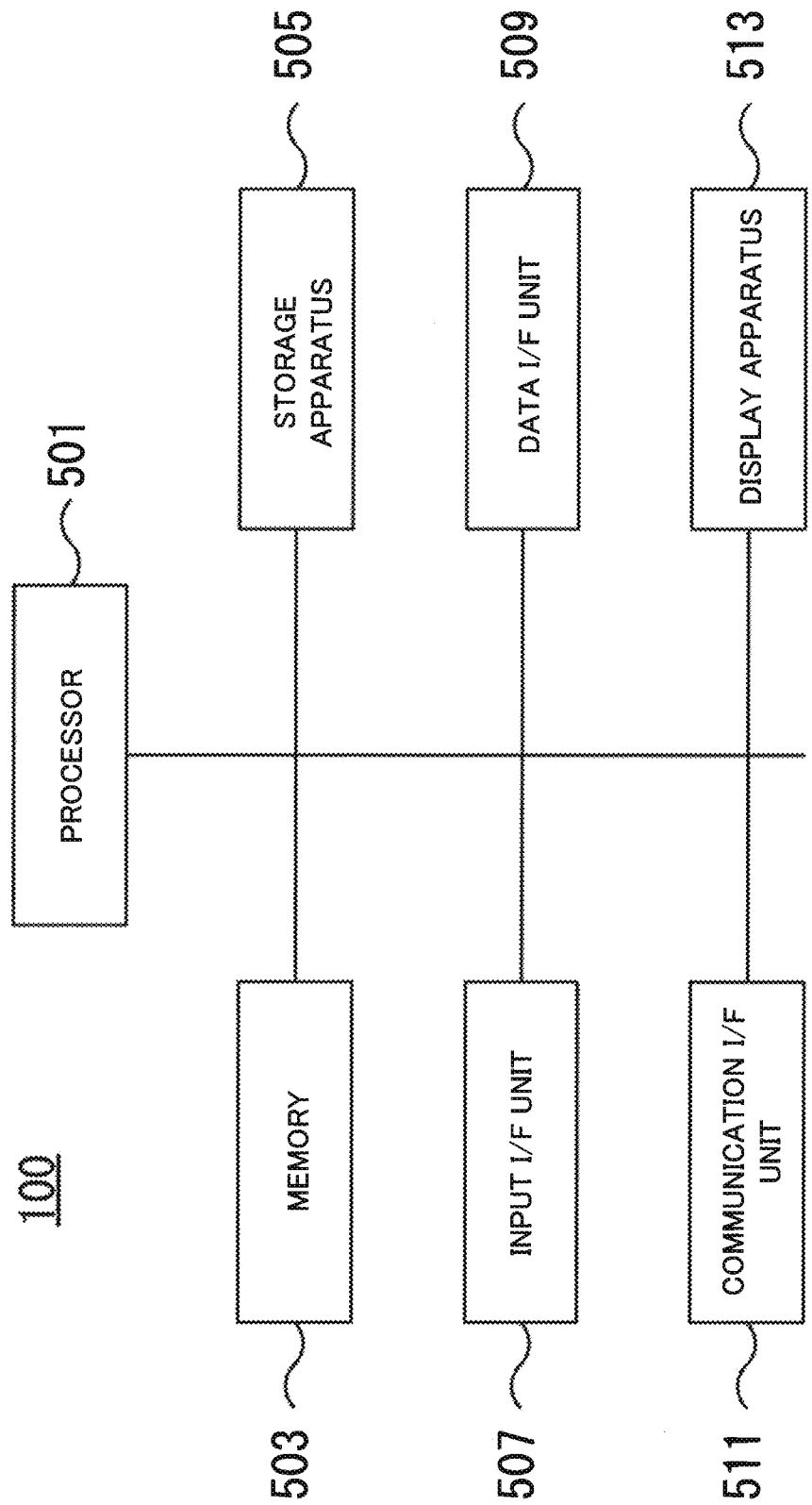
FIG. 5 is a block diagram illustrating a hardware configuration which can implement a detection system illustrated in FIG. 3.

Hereinafter, one example of a hardware configuration when the above-described image processing system 100 is realized by a computer will be described with reference to FIG. 5. As illustrated in FIG. 5, the image processing system 100 includes a processor 501, a memory 503, a storage apparatus 505, an input interface (I/F) unit 507, a data I/F unit 509, a communication I/F unit 511, and a display apparatus 513.

The processor 501 controls a variety of processes of the image processing system 100 by executing a program stored in the memory 503. For example, processes related to the image input unit 110, the background image generation unit 120, the difference area extraction unit 140, the edge detection unit 150, the edge area extraction unit 160, the superimposition unit 170, and the output unit 180 illustrated in FIG. 3 can be realized as a program which is temporarily stored in the memory 503 and operates mainly on the processor 501.

The memory 503 is, for example, a storage medium such as a RAM (Random Access Memory). The memory 503 temporarily stores a program code of a program executed by the processor 501 or data needed when a program is executed.

The storage apparatus 505 is, for example, a non-volatile storage medium such as a hard disk or a flash memory. The storage apparatus 505 can store a variety of programs for realizing each function of an operating system or the image processing system 100, a variety of data including the background image DB130, or the like. A program or data stored in the storage apparatus 505 is referred to by the processor 501 by being loaded on the memory 503 as needed.

The input I/F unit 507 is a device for receiving an input from a user. Specific examples of the input I/F unit 507 include a keyboard, a mouse, or a touch panel. The input I/F unit 507 may be connected to the image processing system 100 via an interface such as a USB (Universal Serial Bus).

The data I/F unit 509 is a device for inputting data from outside the image processing system 100. Specific examples of the data I/F unit 509 include a drive apparatus for reading data stored in a variety of storage apparatuses. The data I/F unit 509 may be provided outside the image processing system 100. In this case, the data I/F unit 509 is connected to the image processing system 100 via an interface such as a USB.

The communication I/F unit 511 is a device for performing data communication with an apparatus outside the image processing system 100 such as an imaging apparatus (a video camera, a monitoring camera, or a digital camera) with a wire or wirelessly. The communication I/F unit 511 may be provided outside the image processing system 100. In this case, the communication I/F unit 511 is connected to the image processing system 100 via an interface such as a USB.

The display apparatus 513 is a device for displaying, for example, an output image or the like output by the output unit 180. Specific examples of the display apparatus 513 include a liquid crystal display or an organic EL (Electro-Luminescence) display. The display apparatus 513 may be provided outside the image processing system 100. In this case, the display apparatus 513 is connected to the image processing system 100 via, for example, a display cable.

(1.5 Effects According to the Present Embodiment)

As described above, the image processing system 100 according to the present example embodiment generates an output image by superimposing only an image frame to be processed (original image) of an edge area on the background image.

By this, a user who visually confirms an output image can confirm a shape of a moving object corresponding to an edge area to be detected, a relationship between the moving object and a background, or the like. Since an area other than an edge area of a moving object is not included in an output image, what type of user appears cannot be determined by the output image. That is, private information is considered for an output image generated by the image processing system 100.

A method such as displaying a contour portion of a moving object detected by performing detection or the like of a moving object has a problem that, when the degree of precision of detection of a moving object is not sufficient, a portion other than a moving object appears on an output image. On the other hand, in a method according to the present example embodiment, an image frame to be processed of an edge area itself is displayed; and therefore, a feeling of strangeness is less likely to be inspired by a user who confirms an output image even when a portion other than a moving object is detected as an edge area since the portion is almost assimilated to a background image.

(2 Second Embodiment)

Figure 6:
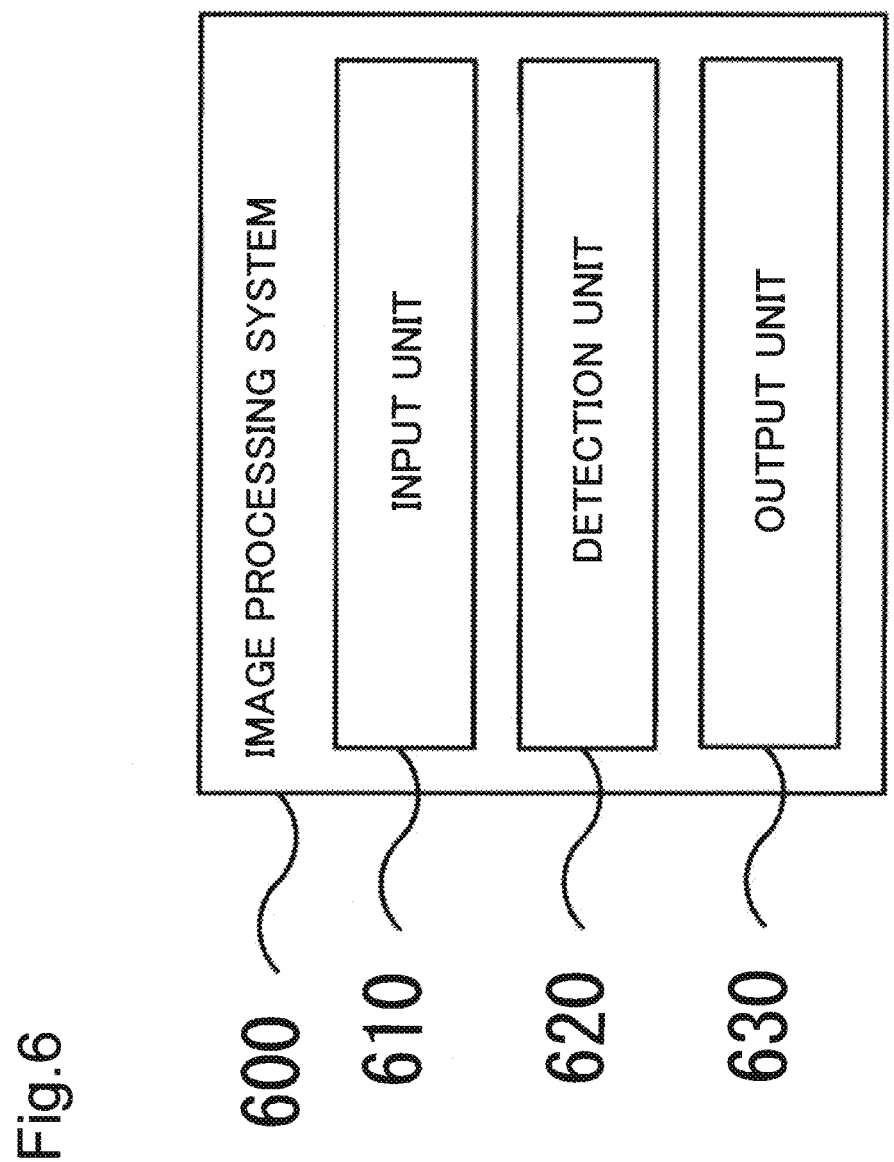
FIG. 6 is a functional block diagram illustrating a schematic configuration of an image processing system according to a second example embodiment.

Hereinafter, a second example embodiment will be described with reference to FIG. 6. FIG. 6 is a block diagram illustrating a functional configuration of the image processing system 600 according to the present example embodiment. The image processing system 600 includes an input unit 610, a detection unit 620, and an output unit 630.

The input unit 610 receives an input of a plurality of image frames constituting a video from an unillustrated imaging apparatus such as a camera.

The detection unit 620 detects a feature point contained in an image frame to be processed in a plurality of image frames. Here, a feature point may include an edge such as a contour line of a moving object, for example, a person, or a special point such as a corner point.

The output unit 630 outputs an output image obtained by superimposing an image frame to be processed of an area detected as a feature point on a background image generated from at least some of a plurality of image frames.

By employing such an implementation, the image processing system 600 according to the present example embodiment can generate an image for which private information is suitably protected.

(3 Supplementary Notes)

The configurations of the example embodiments described above may be combined or some configuration may be replaced with. The configuration of the present invention is not limited only to the example embodiments described above, and a variety of changes can be made without departing from the scope of the present invention.

Some or all of the example embodiments described above may also be described as the following Supplementary notes, but the present invention is not limited to the following. A program according to the present invention may be a program which causes a computer to execute each operation described in each of the above-described example embodiments.

(Supplementary Note 1)

An image processing system including: means for receiving an input of a plurality of image frames constituting a video from an imaging apparatus; detection means for detecting a feature point included in an image frame to be processed in the plurality of image frames; and means for outputting an output image obtained by superimposing an image frame to be processed of an area detected as a feature point on a background image generated from at least some of a plurality of image frames.

(Supplementary Note 2)

The image processing system according to Supplementary note 1, wherein the feature point is an edge portion.

(Supplementary Note 3)

The image processing system according to Supplementary note 2, wherein the detection means detects the edge portion for an area in which a difference in the image frame to be processed from the background image is not less than a threshold.

(Supplementary Note 4)

The image processing system according to Supplementary note 2 or 3, wherein the output image is obtained by superimposing the image frame to be processed of some of an area detected as the edge portion on the background image.

(Supplementary Note 5)

The image processing system according to any one of Supplementary notes 2 to 4, wherein the output image is obtained by superimposing an image frame of an area detected as the edge portion on the background image in an aspect differing depending on a position.

(Supplementary Note 6)

The image processing system according to Supplementary note 5, wherein the output image is obtained by superimposing an image frame of an area detected as the edge portion on the background image in an aspect differing depending on a site of a moving object.

(Supplementary Note 7)

An image processing method including: a step of receiving an input of a plurality of image frames constituting a video from an imaging apparatus; a step of detecting a feature point included in an image frame to be processed in the plurality of image frames; and a step of outputting an output image obtained by superimposing an image frame to be processed of an area detected as a feature point on a background image generated from at least some of a plurality of image frames.

(Supplementary Note 8)

The image processing method according to Supplementary note 7, wherein the feature point is an edge portion.

(Supplementary Note 9)

The image processing method according to Supplementary note 8, wherein the edge portion for an area in which a difference in the image frame to be processed from the background image is not less than a threshold, is detected.

(Supplementary Note 10)

The image processing method according to Supplementary note 8 or 9, wherein the output image is obtained by superimposing the image frame to be processed of some of an area detected as the edge portion on the background image.

(Supplementary Note 11)

The image processing method according to any one of Supplementary notes 8 to 10, wherein the output image is obtained by superimposing an image frame of an area detected as the edge portion on the background image in an aspect differing depending on a position.

(Supplementary Note 12)

The image processing method according to Supplementary note 11, wherein the output image is obtained by superimposing an image frame of an area detected as the edge portion on the background image in an aspect differing depending on a site of a moving object.

(Supplementary Note 13)

A program causing a computer to execute: a processing of receiving an input of a plurality of image frames constituting a video from an imaging apparatus; a processing of detecting a feature point included in an image frame to be processed in the plurality of image frames; and a processing of outputting an output image obtained by superimposing an image frame to be processed of an area detected as a feature point on a background image generated from at least some of a plurality of image frames.

(Supplementary Note 14)

The program according to Supplementary note 13, wherein the feature point is an edge portion.

(Supplementary Note 15)

The program according to Supplementary note 14, wherein the edge portion for an area in which a difference in the image frame to be processed from the background image is not less than a threshold, is detected.

(Supplementary Note 16)

The program according to Supplementary note 14 or 15, wherein the output image is obtained by superimposing the image frame to be processed of some of an area detected as the edge portion on the background image.

(Supplementary Note 17)

The program according to any one of Supplementary notes 14 to 16, wherein the output image is obtained by superimposing an image frame of an area detected as the edge portion on the background image in an aspect differing depending on a position.

(Supplementary Note 18)

The program according to Supplementary note 17, wherein the output image is obtained by superimposing an image frame of an area detected as the edge portion on the background image in an aspect differing depending on a site of a moving object.

The present invention has been described by way of example embodiments as described above as exemplary examples. However, the present invention is not limited to the above-described example embodiments. In other words, a variety of aspects which can be understood by those skilled in the art can be applied to the present invention without departing from the scope of the present invention.

This application claims the priority based on Japanese Patent Application No. 2014-134961 filed on Jun. 22, 2014, the entire disclosure of which is incorporated herein by reference.

REFERENCE SIGNS LIST

100: Image processing system
110: Image input unit

120: Background image generation unit
130: Background image database
140: Difference area extraction unit
150: Edge detection unit
160: Edge area extraction unit
170: Superimposition unit
180: Output unit
501: Processor
503: Memory
505: Storage apparatus
507: Input interface unit
509: Data interface unit
511: Communication interface unit
513: Display apparatus
600: Image processing system
610: Input unit
620: Detection unit
630: Output unit

What is claimed is:

1. An imaging processing system comprising:
a memory storing computer program instructions; and
at least one processor configured to execute the computer program instructions to:
generate a foreground image by extracting, from a first image frame, a difference area in which a difference from a background image is not less than a certain threshold;
extract an edge portion from the generated foreground image; and
generate a second image frame to be output by superimposing the edge portion and the background image,
wherein transparency of the second image frame is dependent on an intensity of the edge portion.

2. The imaging processing system according to claim 1, wherein the at least one processor is configured to extract the edge portion in which a difference between the first image frame and the background image is not less than a threshold.

3. The imaging processing system according to claim 1, wherein the second image frame is generated by superimposing some of pixels extracted as the edge portion on the background image.

4. The imaging processing system according to claim 1, wherein the second image frame is generated by superimposing a third image frame of pixels extracted as the edge portion on the background image in an aspect differing depending on a position.

5. The imaging processing system according to claim 4, wherein the second image frame is generated by superimposing a third image frame of pixels extracted as the edge portion on the background image in an aspect differing depending on a site of a moving object.

6. An image processing method comprising:
generating a foreground image by removing a background image from a first image frame;
extracting an edge portion from the generated foreground image; and
generating a second image frame to be output by duplicating the edge portion and the background image,
wherein transparency of the second image frame is dependent on an intensity of the edge portion.

7. A non-transitory storage medium for storing a program causing a computer to execute an image processing method comprising:
generating a foreground image by extracting, from a first image frame, a difference area in which a difference from a background image is not less than a certain threshold;
extracting an edge portion from the generated foreground image; and
generating a second image frame to be output by superimposing the edge portion and the background image,
wherein transparency of the second image frame is dependent on an intensity of the edge portion.

8. The imaging processing system according to claim 1, wherein an appearance of the second image frame is dependent on pixel values of the edge portion.

* * * * *